US009804659B2

(12) United States Patent
Gu et al.

(10) Patent No.: US 9,804,659 B2
(45) Date of Patent: Oct. 31, 2017

(54) ON-CHIP SENSOR HUB, AND MOBILE DEVICE AND MULTI-SENSOR MANAGEMENT METHOD THEREFOR

(71) Applicant: VIA Alliance Semiconductor Co., Ltd., Shanghai (CN)

(72) Inventors: Deming Gu, Shanghai (CN); Zhou Hong, Cupertino, CA (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 81 days.

(21) Appl. No.: 14/930,944

(22) Filed: Nov. 3, 2015

(65) Prior Publication Data

US 2016/0370838 A1 Dec. 22, 2016

(30) Foreign Application Priority Data

Jun. 19, 2015 (CN) .......................... 2015 1 0342546

(51) Int. Cl.
*G06F 1/00* (2006.01)
*G06F 1/32* (2006.01)
(Continued)

(52) U.S. Cl.
CPC ............... *G06F 1/324* (2013.01); *G06F 1/32* (2013.01); *G06F 1/3275* (2013.01);
(Continued)

(58) Field of Classification Search
CPC .......... G06F 1/324; G06F 1/32; G06F 1/3275; G06F 3/0604; G06F 3/0625;
(Continued)

(56) References Cited

U.S. PATENT DOCUMENTS 8,892,403 B1  11/2014 Le Grand et al.
2012/0100895 A1  4/2012 Priyantha et al.
(Continued)

FOREIGN PATENT DOCUMENTS

WO   WO 2015099802 A1 * 7/2015 ........... G06F 1/3206

OTHER PUBLICATIONS

Chinese language office action dated Jan. 13, 2017, issued in application No. TW 104127631.
European Search Report dated Jan. 25, 2017, issued in application No. 15193996.4-1879/3106997.

Primary Examiner — Nitin Patel
(74) Attorney, Agent, or Firm — McClure, Qualey & Rodack, LLP

(57) ABSTRACT

An on-chip sensor hub fabricated on a chip with a main processor of a mobile device, and the mobile device, and a method for multi-sensor management on the mobile device. An on-chip sensor hub includes a co-processor and uses an inter-process communication interface. The co-processor and main processor of the mobile device are fabricated on the same chip and communicate with each other via the inter-process communication interface. The co-processor controls a plurality of sensors in the mobile device in accordance with requests issued from the main processor. The co-processor further collects and manages sensor data from the sensors to be processed by the main processor.

12 Claims, 4 Drawing Sheets

(51) Int. Cl.
*G06F 15/78* (2006.01)
*G06F 3/06* (2006.01)

(52) U.S. Cl.
CPC ............ *G06F 3/0604* (2013.01); *G06F 3/067* (2013.01); *G06F 3/0625* (2013.01); *G06F 3/0629* (2013.01); *G06F 15/78* (2013.01); *Y02B 60/1207* (2013.01); *Y02B 60/1225* (2013.01)

(58) Field of Classification Search
CPC ........ G06F 3/0629; G06F 3/067; G06F 15/78; G06F 1/329; G06F 1/3293; G06F 1/3296
USPC ....................................................... 713/322
See application file for complete search history.

(56) References Cited

U.S. PATENT DOCUMENTS

| | | |
|---|---|---|
| 2013/0067259 A1 | 3/2013 | Freiwald et al. |
| 2014/0181556 A1* | 6/2014 | Eckert ..................... G06F 1/324 713/323 |
| 2014/0194782 A1* | 7/2014 | Rahman ................ G06F 1/3296 600/595 |
| 2014/0237477 A1 | 8/2014 | Cadambi et al. |
| 2015/0082062 A1 | 3/2015 | Saraswat et al. |
| 2015/0127300 A1 | 5/2015 | Bluming et al. |
| 2015/0277545 A1* | 10/2015 | Flowers ................ G06F 1/3296 713/323 |

* cited by examiner

ON-CHIP SENSOR HUB, AND MOBILE DEVICE AND MULTI-SENSOR MANAGEMENT METHOD THEREFOR

CROSS REFERENCE TO RELATED APPLICATIONS

This Application claims priority of China Patent Application No. 201510342546.X, filed on Jun. 19, 2015, the entirety of which is incorporated by reference herein.

BACKGROUND OF THE INVENTION

Field of the Invention

The present invention relates to an on-chip sensor hub and mobile devices using the same and multi-sensor management methods therefor.

Description of the Related Art

A mobile device usually has several sensors. For controlling the sensors and collecting and managing the sensor data, there is a sensor hub on the mobile device. Lowering the cost and power consumption of the sensor hub is the key design point.

BRIEF SUMMARY OF THE INVENTION

In the disclosure, a sensor hub and a main processor of a mobile device are fabricated on a single chip. An on-chip sensor hub based on single-chip integration is shown.

An on-chip sensor hub in accordance with an exemplary embodiment of the disclosure comprises a co-processor and an IPC interface (an inter-process communication interface). The co-processor and a main processor of a mobile device are fabricated on a chip. The co-processor and the main processor communicate within the chip through the IPC interface. Based on the requests issued from the main processor, the co-processor controls a plurality of sensors of the mobile device and collects and manages sensor data from the plurality of sensors to be processed by the main processor.

An on-chip sensor hub may use a volatile memory module that provides multiple divisions powered separately (i.e. in a distributed architecture). Thus, power consumption is reduced.

In another exemplary embodiment, the on-chip sensor hub may adjust the operation clock of the co-processor to reduce power consumption.

In another exemplary embodiment, the on-chip sensor hub may perform the co-processor with a clock gate control to reduce power consumption.

In another exemplary embodiment, the on-chip sensor hub may operate the clock-gate-controlled co-processor at low operating voltages when the main processor is in the power-saving state.

In another exemplary embodiment, a mobile device using the on-chip sensor hub is shown, which further includes a main processor integrated with the on-chip sensor hub and a plurality of sensors. Through the on-chip sensor hub, the main processor controls the sensors and collects and manages sensor data from the sensors.

A multi-sensor management method for a mobile device in accordance with an exemplary embodiment of the disclosure comprises: providing a co-processor, the co-processor is fabricated with a main processor of a mobile device on a chip; and building communications between the co-processor and the main chip in the chip via the inter-process interface. Based on the requests issued from the main processor, the co-processor controls a plurality of sensors of the mobile device and collects and manages sensor data from the plurality of sensors to be processed by the main processor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

Figure 1:
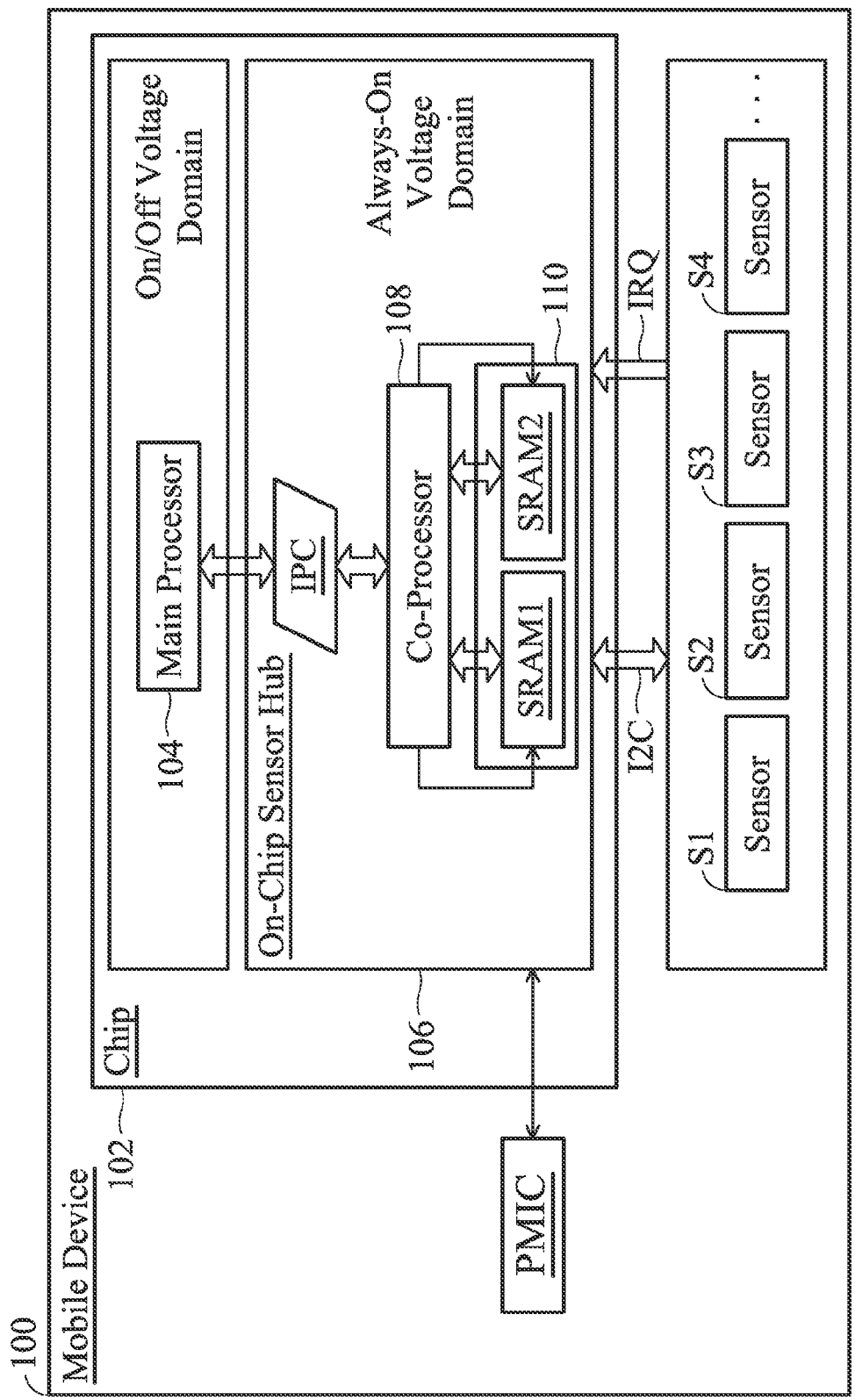
FIG. 1 depicts a mobile device 100 in accordance with an exemplary embodiment of the disclosure, which includes an on-chip sensor hub 106.

FIG. 1 depicts a mobile device 100 in accordance with an exemplary embodiment of the disclosure, which includes a chip 102, a plurality of sensors S1, S2, S3, S4 and so on, and a power management integrated circuit PMIC. As shown, the main processor 104 of the mobile device 100 and an on-chip sensor hub 106 are integrated in the chip 102 based on single-chip integration. The on-chip sensor hub 106 includes a co-processor 108, an inter-process communication interface IPC and a non-volatile memory module 110 in a distributed architecture.

The inter-process communication interface IPC is provided for establishing communication between the co-processor 108 and the main processor 104 within the chip 102. In this manner, the communication speed between the main processor 104 and the on-chip sensor hub 106 is much faster than those using a conventional design. In a conventional design, a sensor hub is external to the chip of the main processor. The communication between the on-chip sensor hub 106 and the sensors S1, S2, S3, S4 . . . of the mobile device 100 is based on an inter-integrated circuit bus I2C. The sensors S1, S2, S3, S4 . . . may output an interrupt signal IRQ to the on-chip sensor hub 106. The requests output from the main processor 104 are conveyed to the co-processor 108 through the inter-process communication interface IPC and, accordingly, the co-processor 108 controls the sensors S1, S2, S3, S4 . . . through the inter-integrated circuit bus I2C. The sensor data detected by the sensors S1, S2, S3, S4 . . . is conveyed to the co-processor 108 through the inter-integrated circuit bus I2C. The co-processor 108 collects and manages the sensor data and, through the inter-process communication interface IPC, the collected and managed sensor data is conveyed to the main processor 104 to be processed by the main processor 104. The co-processor 108 further performs task scheduling, power management, and sensor data fusion and calibration and management on the sensors S1, S2, S3, S4 . . . . The co-processor 108 works as a sensor driver of the sensors S1, S2, S3, S4 . . . .

In the exemplary embodiment of FIG. 1, the distributed non-volatile memory module 110 in a distributed architecture is implemented by a distributed SRAM. The distributed SRAM provides a memory space SRAM1 and a memory space SRAM2 which are powered separately. The memory space SRAM1 and the memory space SRAM2 are allocated for different operations that the co-processor 108 performs on the sensors S1, S2, S3, S4 . . . , examples of which are discussed below. The memory space SRAM1 may correspond to the normal operations that the co-processor 108 performs on the sensors S1, S2, S3, S4 . . . . The normal operations are performed on the sensors in normal states, including intelligent waking up procedures, activity monitoring, interrupt request (IRQ) detection, and so on. The memory space SRAM2 may correspond to the infrequent operations that the co-processor 108 performs on the sensors S1, S2, S3, S4 . . . . The infrequent operations are performed on the sensors for particular and infrequent scenarios. The co-processor 108 performs an analysis on the requests issued from the main processor 104. When the infrequent operations are not performed, the co-processor 108 switches the memory space SRAM2 into a low-power data retention state without affecting the power of the memory space SRAM1. In the low-power data retention state, the memory space SRAM1 retains data in a power-saving mode which results in a significant energy savings. In an exemplary embodiment, the size of the memory space SRAM1 is much smaller than the size of the memory space SRAM2. When the memory space SRAM2 is switched to the low-power data retention state, the memory space SRAM1 with a small size only consumes a limited amount of power.

In an exemplary embodiment, the main processor 104 and the on-chip sensor hub 106 are fabricated in different power areas of the chip 102. For example, the main processor 104 may be fabricated in an on/off voltage domain and the on-chip sensor hub 106 may be fabricated in an always-on voltage domain. The power management of the main processor 104 may be separated from the power management of the on-chip sensor hub 106.

The on-chip sensor hub 106 may adjust the operation clock of the co-processor 108 to reduce power consumption in a technique named clock switching.

The on-chip sensor hub 106 may operate the co-processor 108 with clock gating to reduce power consumption. Furthermore, when the main processor 104 is in a power-saving state (e.g., only the background detection is running), the co-processor 108 with clock gating is driven by the on-chip sensor hub 106 to operate at low voltages and thereby reduce power consumption. The power management integrated circuit PMIC may be switched by the co-processor 108 to operate the co-processor 108 at low voltages (e.g. down to 0.7V).

Figure 2:
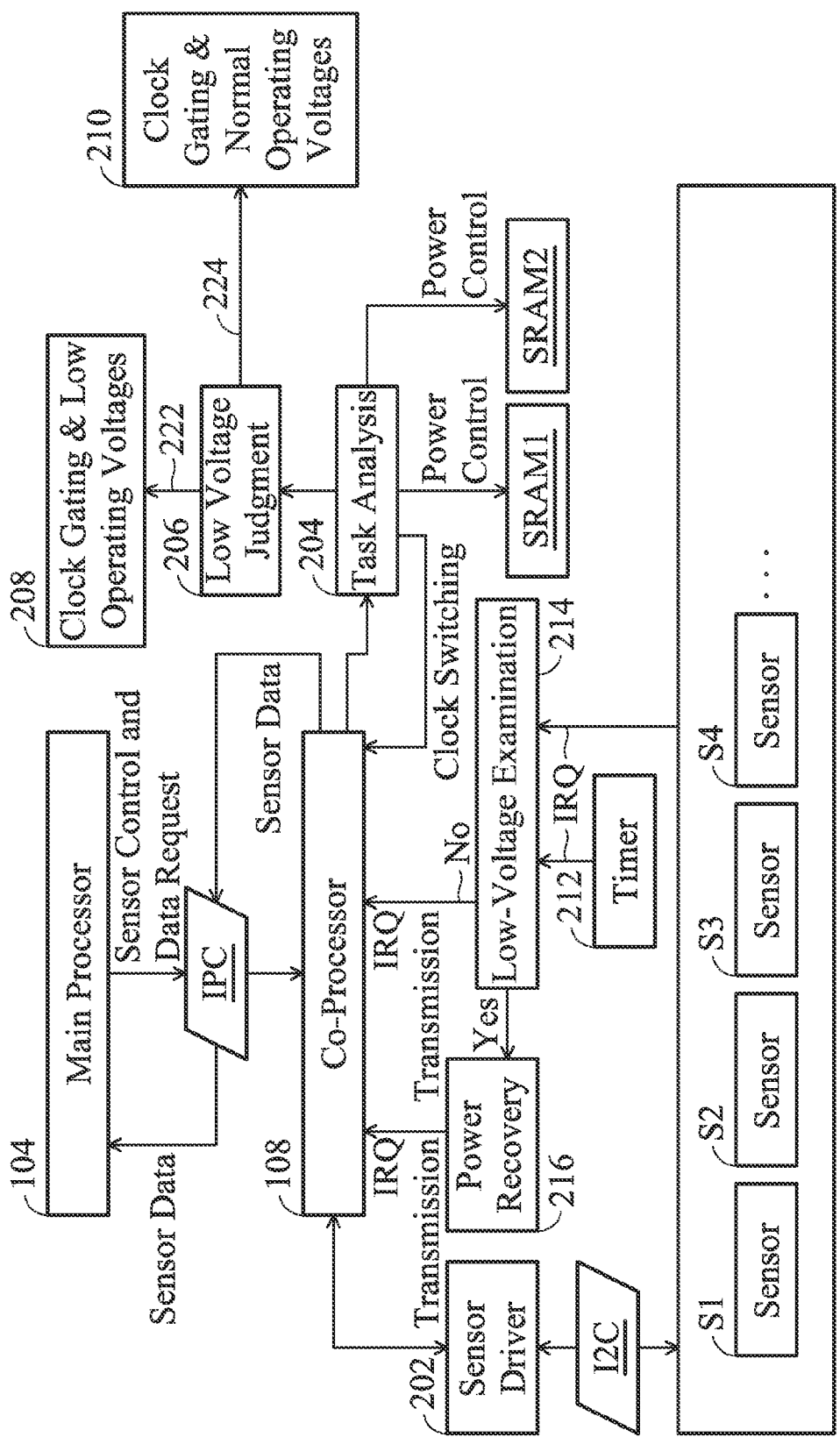
FIG. 2 shows the management method for the multiple sensors S1, S2, S3, S4 . . . of the mobile device 100

FIG. 2 shows the management method for the multiple sensors S1, S2, S3, S4 . . . of the mobile device 100.

The control requests for the sensors (e.g. turning on or off a sensor) and data requests issued by the main processor 104 are conveyed to the co-processor 108 through the inter-process communication interface IPC, and the co-processor 108 thereby executes the sensor driver 202 to operate the sensors S1, S2, S3, S4 . . . through the inter-integrated circuit bus I2C and to collect sensor data and return the sensor data to the main processor 104.

The co-processor 108 analyzes further the tasks of the sensors S1, S2, S3, S4 . . . (i.e. the task analysis 204) based on the requests issued from the main processor 104, to properly switch the memory space SRAM2 to the low-power data retention state independently from the memory space SRAM1. For example, when the memory space SRAM1 is allocated for normal operations and the memory space SRAM2 is allocated for infrequent operations, the memory space SRAM2 is usually operated in the low-power data retention state.

Based on the task analysis 204, the co-processor 108 may further change the operation clock of the co-processor 108 based on the workload of the sensors S1, S2, S3, S4 . . . and power consumption is reduced by switching the operation clock.

Based on the task analysis 204, the co-processor 108 may operate the co-processor 108 with clock gating when the sensors S1, S2, S3, S4 . . . are idle (e.g., in a task idle state). Furthermore, the co-processor 108 may perform a further low-voltage judgment 206 to determine whether the main processor 104 is in a power-saving state. When the main processor 104 is in a power-saving state (222), the low-voltage operation condition is satisfied, the co-processor 108 is switched to low operating voltages, and the power-gating technique is turned on (state 208). When the main processor 104 is not in a power-saving state (224, e.g., playing video and audio), the low-voltage operation condition is not satisfied and the co-processor 108 is operated with clock gating (state 210) without being switched to low operating voltages.

As for a power recovery process, one of the sensors S1, S2, S3, S4 . . . may output an interrupt signal IRQ, or a timer 212 may periodically output an interrupt signal IRQ. The co-processor 108 may perform a self-examination to check whether the co-processor 108 itself is operating at low operating voltages (referring to the low voltage examination 214). When being operated at low operating voltages, the co-processor 108 performs a power recovery process 216 to leave the low voltage operation and to process the interrupt signal IRQ. Otherwise, the co-processor 108 process the received interrupt signal IRQ without performing the power recovery process 216.

Figure 3:
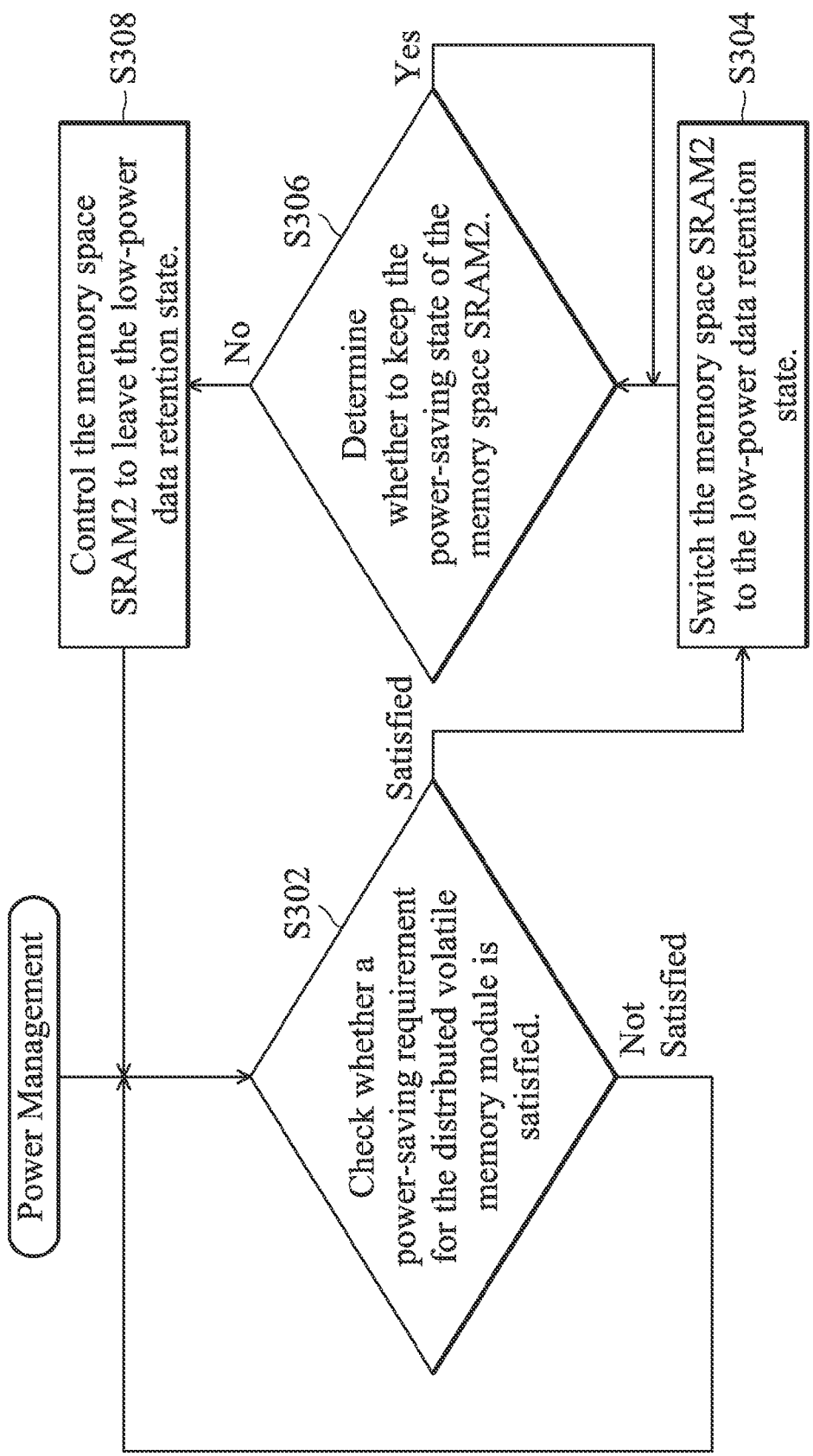
FIG. 3 is a flowchart depicting a power management method for the on-chip sensor hub 106 in accordance with an exemplary embodiment of the disclosure.

FIG. 3 is a flowchart depicting a power management method for the on-chip sensor hub 106 in accordance with an exemplary embodiment of the disclosure. In step S302, based on a task analysis (204), the co-processor 108 determines whether a power-saving requirement for the distributed volatile memory module is reached, the distributed volatile memory stated above comprises the memory space SRAM1 and the memory space SRAM2. If yes, the memory space SRAM2 is switched to the low-power data retention state independently from the memory space SRAM1 (S304) and then the co-processor 108 keeps doing the task analysis, and step S306 is performed to determine whether to keep the power-saving state of the memory space SRAM2. If not, step S308 is performed and the memory space SRAM2 leaves the low-power data retention state and returns to normal operations.

Figure 4:
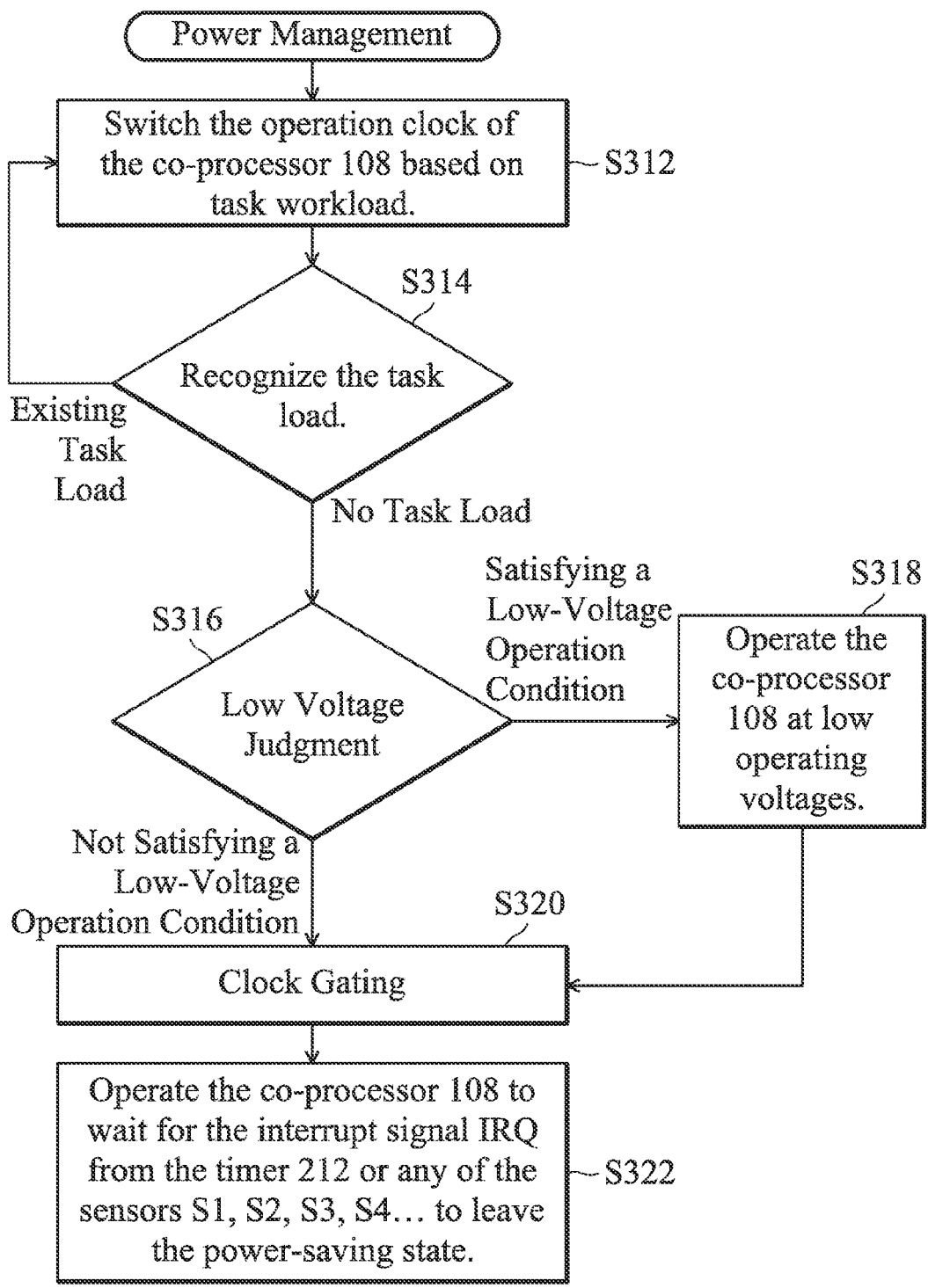
FIG. 4 is a flowchart depicting a power management method for the on-chip sensor hub 106 in accordance with another exemplary embodiment of the disclosure.

FIG. 4 is a flowchart depicting a power management method for the on-chip sensor hub 106 in accordance with another exemplary embodiment of the disclosure. In step S312, the operation clock of the co-processor 108 is switched based on task workload. In step S314, the sensors S1, S2, S3, S4 . . . are monitored to recognize the task load. When there is no task load, step S316 is performed for a low-voltage judgment (206). When a low-voltage operation condition is satisfied, steps S318 and S320 are performed. In step S318, the power management integrated circuit PMIC is controlled to switch the co-processor 108 to low operating voltages. In step S320, the co-processor 108 is operated with clock gating. When the low-voltage operation condition is not satisfied, step S320 is performed when S318 is bypassed. After step S320, step S322 is performed. In step S322, the co-processor 108 waits for the interrupt signal IRQ from the timer 212 or any of the sensors S1, S2, S3, S4 . . . to leave the power-saving state.

Techniques for sensor management of mobile device based on the aforementioned concept are within the scope of the invention. Multi-sensor management methods for mobile device based on the aforementioned concept are also developed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An on-chip sensor hub based on single-chip integration, comprising:
   a co-processor, fabricated on a chip with a main processor of a mobile device;
   an inter-process communication interface, for communications within the chip between the co-processor and the main processor; and
   a distributed volatile memory module, comprising a first memory space and a second memory space which are powered separately,
   wherein:
   the co-processor controls a plurality of sensors of the mobile device based on requests issued from the main processor, and collects and manages sensor data from the plurality of sensors to be processed by the main processor;
   the first memory space is used when the co-processor performs a first kind of operations on the sensors;
   the second memory space is used when the co-processor performs a second kind of operations, infrequent in comparison with the first kind of operations, on the sensors; and
   the co-processor further analyzes the requests issued from the main processor and, when the second kind of operations are not being performed, the co-processor switches the second memory space to a low-power data retention state independently from the first memory space.

2. The on-chip sensor hub based on single-chip integration as claimed in claim 1, wherein:
   the first memory space is smaller than the second memory space.

3. The on-chip sensor hub based on single-chip integration as claimed in claim 1, wherein:
   the co-processor further analyzes the requests issued from the main processor to adjust an operation clock of the co-processor based on workload of the plurality of sensors.

4. The on-chip sensor hub based on single-chip integration as claimed in claim 1, wherein:
   the co-processor further analyzes the requests issued from the main processor and, when the sensors are idle, the co-processor is operated with clock gating.

5. The on-chip sensor hub based on single-chip integration as claimed in claim 4, wherein:
   when the main processor is in a power-saving state, the co-processor with clock gating is operated at low operating voltages.

6. The on-chip sensor hub based on single-chip integration as claimed in claim 5, wherein:
   the co-processor further performs a self-examination based on an interrupt signal from any of the sensors or a timer, to check whether the co-processor is operated at the low operating voltages; and
   the co-processor processes the interrupt signal when the co-processor has been switched to leave the low operating voltages.

7. A mobile device, comprising:
   a chip, comprising an on-chip sensor hub and a main processor, the on-chip sensor hub comprising:
      a co-processor, fabricated on a chip with a main processor of a mobile device; and
      an inter-process communication interface, for communications within the chip between the co-processor and the main processor; and
      a distributed volatile memory module, comprising a first memory space and a second memory space which are powered separately,
   wherein:
   the co-processor controls a plurality of sensors of the mobile device based on requests issued from the main processor, and collects and manages sensor data from the plurality of sensors to be processed by the main processor;
   the first memory space is used when the co-processor performs a first kind of operations on the sensors;
   the second memory space is used when the co-processor performs a second kind of operations, infrequent in comparison with the first kind of operations, on the sensors; and
   the co-processor further analyzes the requests issued from the main processor and, when the second kind of operations are not being performed, the co-processor switches the second memory space to a low-power data retention state independently from the first memory space;
   and
   a plurality of sensors, controlled by the main processor through on-chip sensor hub,
   wherein, through the on-chip sensor hub, the main processor collects and manages sensor data from the plurality of sensors.

8. A multi-sensor management method for a mobile device, comprising:
   providing a co-processor, which is fabricated on a chip with a main processor of the mobile device;
   using an inter-process communication interface for communications within the chip between the co-processor and the main processor; and
   providing a distributed volatile memory module, wherein the distributed volatile memory module comprises a first memory space and a second memory space which are powered separately,
   wherein:
   the co-processor controls a plurality of sensors of the mobile device based on requests issued from the main processor, and collects and manages sensor data from the plurality of sensors to be processed by the main processor;

the first memory space is used when the co-processor performs a first kind of operations on the sensors;

the second memory space is used when the co-processor performs a second kind of operations, infrequent in comparison with the first kind of operations, on the sensors; and the co-processor further analyzes the requests issued from the main processor and, when the second kind of operations are not being performed, the co-processor switches the second memory space to a low-power data retention state independently from the first memory space.

9. The multi-sensor management method for a mobile device as claimed in claim 8, further comprising:

using the co-processor to analyze the requests issued from the main processor to adjust an operation clock of the co-processor based on workload of the plurality of sensors.

10. The multi-sensor management method for a mobile device as claimed in claim 8, further comprising:

using the co-processor to analyze the requests issued from the main processor wherein, when the sensors are idle, the co-processor is operated with clock gating.

11. The multi-sensor management method for a mobile device as claimed in claim 10, wherein:

when the main processor is in a power-saving state, the co-processor with clock gating is operated at low operating voltages.

12. The multi-sensor management method for a mobile device as claimed in claim 11, wherein:

the co-processor further performs a self-examination based on an interrupt signal from any of the sensors or a timer, to check whether the co-processor is operated at the low operating voltages; and the co-processor processes the interrupt signal when the co-processor has been switched to leave the low operating voltages.

* * * * *